Nov. 27, 1945.   L. F. GLAUDE   2,389,902
LOCK NUT ASSEMBLER
Filed June 10, 1944   3 Sheets-Sheet 1
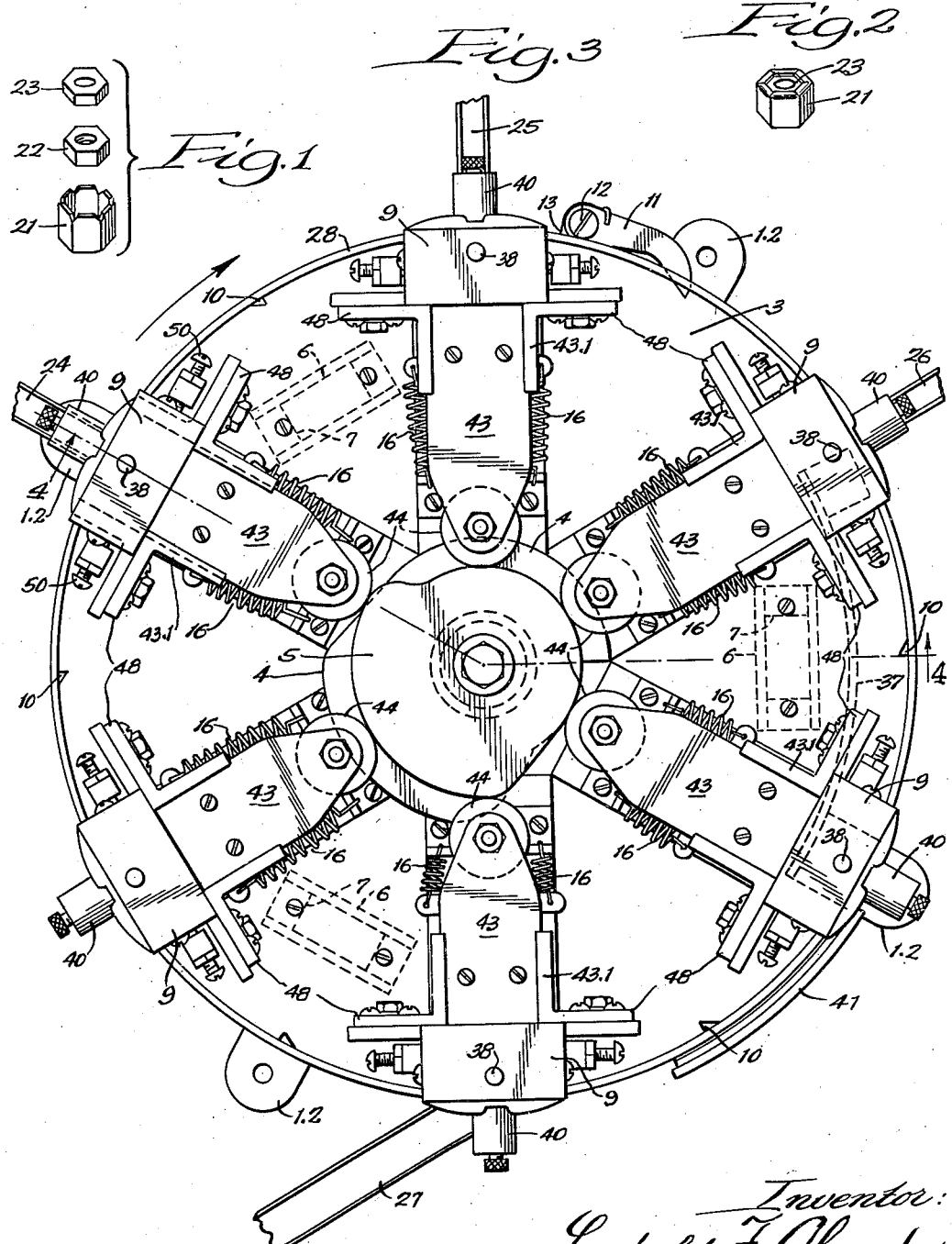
Inventor:
Leopold F. Glaude,
by Rummler, Rummler & Davis,
Attorneys.

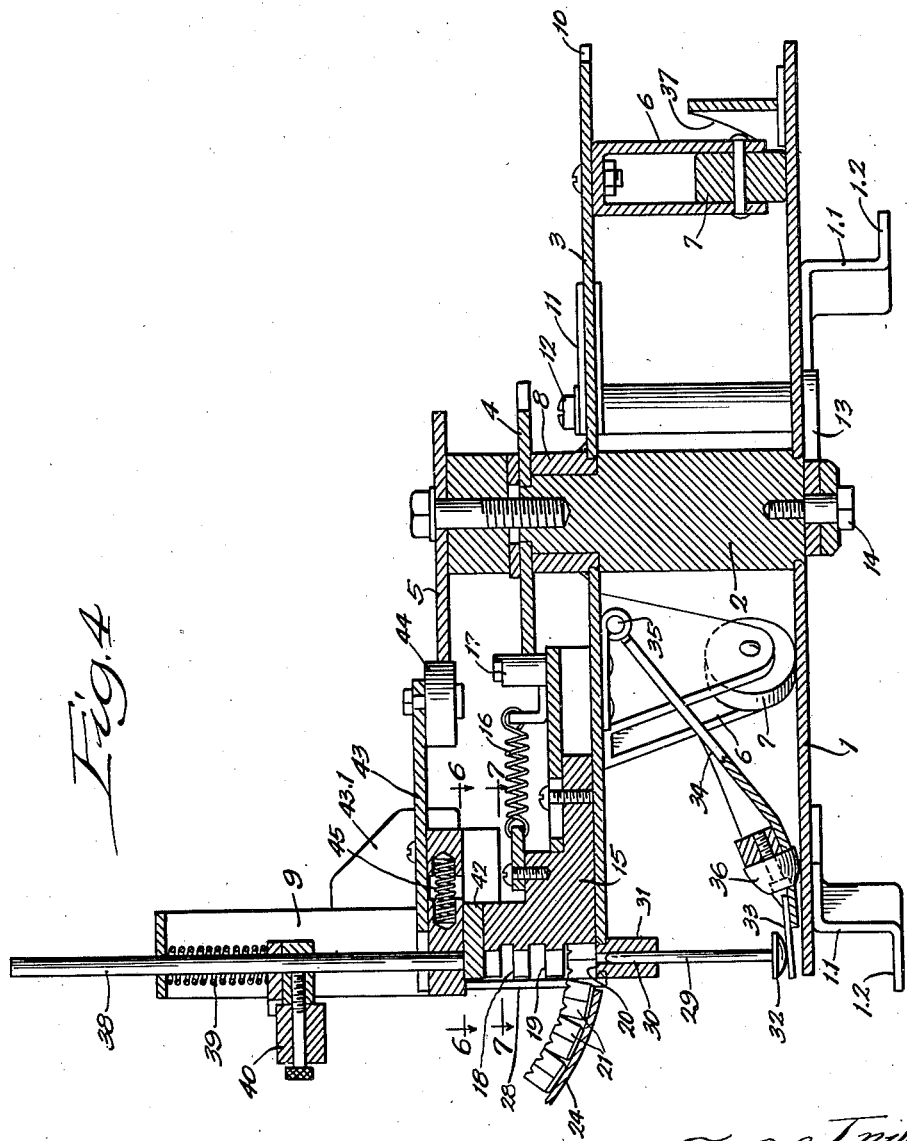

Nov. 27, 1945.   L. F. GLAUDE   2,389,902
LOCK NUT ASSEMBLER
Filed June 10, 1944   3 Sheets-Sheet 3
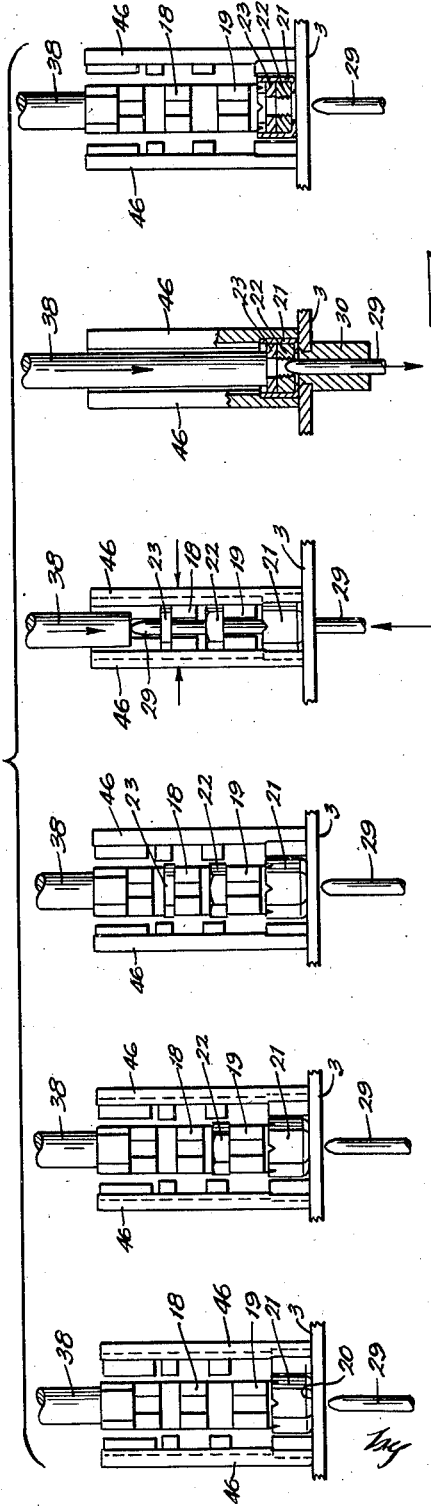
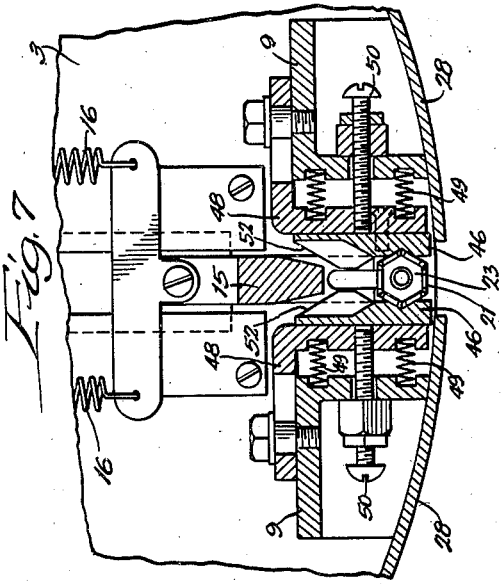
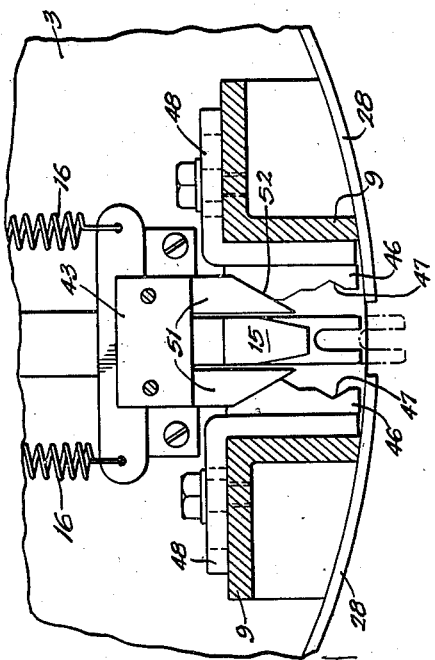
Inventor
Leopold F Glaude,
by Rummler Rummler & Davis,
Attorneys.

Patented Nov. 27, 1945

2,389,902

UNITED STATES PATENT OFFICE 2,389,902

LOCK NUT ASSEMBLER

Leopold F. Glaude, Chicago, Ill.

Application June 10, 1944, Serial No. 539,759

5 Claims. (Cl. 10—155)

This invention relates to assembling devices for placing inserts into shell-like housings, particularly such as are adapted to assemble the parts of prismatic lock nuts made up of a plurality of parts mounted one or more within another.

The main objects of this invention are to provide improved mechanism for performing the operation of assembling the parts of such composite lock nuts with little attention of an operator; to provide means for assembling a prismatic nut and lock washer within a prismatic shell; to provide, in a device of this kind, improved means for placing the elements of a prismatic lock nut structure into an assembled relation with their prismatic contours in registering relation to each other; and to provide mechanism of this kind which may be power driven to operate automatically for considerable periods of time without the attention of an operator.

A specific embodiment of this invention is shown in the accompanying drawings in which:

Figure 1 is an exploded perspective view of a particular form of lock nut.

Fig. 2 is a perspective view of the finished lock nut.

Fig. 3 is a top plan of a machine for assembling such lock nuts which are made up of a prismatic shell containing a prismatic nut and a prismatic friction washer.

Fig. 4 is an elevation, largely in section, taken on the angular line 4—4 of Fig. 3.

Fig. 5 is a series of views of certain parts immediately concerned in the assembling of the nut, showing successive steps in the assembling operation.

Fig. 6 is a fragmentary section taken on the line 6—6 of Fig. 4.

Fig. 7 is a fragmentary transverse section taken on the line 7—7 of Fig. 4.

In the form shown in the drawings, the device comprises a stationary base plate 1 carried by legs 1.1 with feet 1.2 by which it may be fastened to a bench or table. The base plate 1 has a fixed upright post 2 which carries a rotary horizontal plate or table 3 and above this a pair of stationary cams 4 and 5. This table is steadied by means of castors 6 having rollers 7 riding on the base plate 1. The table 3 is also steadied by having a substantial hub 8 journaled on the post 2.

Fixed on the upper surface of the table 3 adjacent its periphery is an annular series of upright frames 9 within which the assembling of the nut parts takes place. In the particular form shown, there are six of such frames 9 and the outer rim of the table 3 is provided with notches 10 equally spaced apart and in any desired multiple of the number of assembling frames 9 that are mounted on the table, so that the table can be rotated by a reciprocating pawl 11 so as to carry the assembling frames in succession in a circular path with pauses at fixed positions along that path. The pawl may be carried by a post 12 on an arm 13 fulcrumed on a central stud 14 and the arm 13 may be angularly reciprocated either by hand or mechanical power means, as will be understood.

Each nut assembling frame has mounted therein a member 15 that is radially slidable on the table 3 and is normally urged by springs 16 to a retracted position, its movement being determined by a roller 17 bearing on the periphery of the cam 4. The slide 15 has a pair of bifurcated shelf arms 18 and 19 located vertically above a marginal ledge 20 on the table 3 when the parts are in the position shown in Fig. 4 and in the three right-hand views of Fig. 5.

In the extreme right-hand view of Fig. 5, the particular form of lock nut, for the assembling of which this machine is designed, is shown in section in the assembled relation of its parts and comprises a cup-shaped shell 21 having a prismatic (hexagonal) exterior wall within which is mounted a close-fitting prismatic nut 22 and a friction washer 23, of like prismatic external contour, the friction washer being of suitable resilient plastic material as required in such lock nuts, as is well known.

Located above the periphery of the table 3 on a surrounding stationary frame, that is not shown, there are a series of supply magazine chutes, the chute 24 being positioned to supply the shell elements 21 to the ledge 20 on the table 3. The supply magazine chute 25 supplies the nuts and has its mouth located at the level of the shelf 19 on the slide 15 so that the nuts are delivered to the shelf 19. The magazine chute 26 is shaped and positioned to feed the friction washers, one at a time, to the shelf 18. Delivery chute 27 is positioned with its mouth at the level of the table, so as to receive the assembled lock nuts and carry them to a punch press where the upper rim of the shell 21 is formed by a suitable die to bend the marginal edges of the shell inwardly, so as to embracingly clamp the nut and friction washer together.

In order that the elements of the lock nut can be fed one at a time by gravity to the assembling mechanisms as the pass the chutes 24 to 26 inclusive, there is a shield band 28 connecting the frames 9 with slits at appropriate locations for receiving the nut elements from the chutes and closing the chutes except when the frames are in direct registry therewith.

Also mounted on the table 3, there is a pin 29 in each frame for holding the nut parts as will be explained. The pin 29 is vertically slidable in a bore 30 that extends upwardly through the table 3 and a guide nipple 31 fixed thereon. The pin 29 has a head 32 which rests on a plate 33 carried by a lever 34 pivoted at 35 and having a roller 36 that normally rides on the base plate 1 but follows a cam track 37 which controls the raising and lowering of the pins 29. The pins 29 are in axial alinement with the nut parts when carried on the shelves 18, 19 and 20.

There is also a plunger or ram 38, that is vertically slidable in the upper part of the frame 9 in direct alinement with the pin 29. The ram 38 is normally urged downwardly by a spring 39 and is lifted by means of a roller 40 which rides on a cam track 41.

The plunger is held in its elevated position, as shown in Fig. 4, by means of a detent in the form of a shelf 42 carried by a slide 43 having a roller 44 bearing on the periphery of the cam 5. A spring 45 normally urges the slide 43 and roller 44 against the cam 5.

Mounted in the frame 9 at opposite sides of the slide 15, there is a pair of guide members 46 which have vertical guideways or grooves 47 shaped to fit the prismatic corners of the shell, the nut and the friction washer when the parts are in the position shown in Fig. 7, so as to align the vertical walls of these nut parts in proper angular relation to each other, so that they will register when they are pushed together by the ram 38.

These guide bars 46 are carried by angle bars 48 which are slidable laterally on the uprights of the frame 9 being normally urged by springs 49 to close the guide bars 46 against the nut elements. Adjustable stop screws 50 limit this movement so that the contact with the nut elements is just sufficient to turn them into accurate registry with each other without imposing undue friction thereon. The bars 46 are urged apart, shown in Fig. 6, by the wedge action of the arms 51 of slide 43 and wedge surfaces 52 of the guide bars 46.

The operation of the device shown is as follows:

The parts are in the position of Fig. 4 when the frame 9 is at rest in registry with the chute 24 from which a nut shell 21 is delivered to the ledge 20. When the frame 9 stops in registry with the supply chute 25, a nut core 22 is delivered to shelf 19 and when the frame 9 stops in registry with the chute 26, a fraction element 23 is delivered to the shelf 18. Further travel of the frame 9 causes the pin 29 to be raised by lever 34 and cam track 37 so as to rise through the holes in the nut parts and hold them in place while the slide 15 under control of cam 4 withdraws the shelves 18 and 19. During this movement of the shelves 18 and 19, the cam 5 guides roller 44 of slide 43, so that the wedges 51 are withdrawn and allow the guide bars or jaws 46 to engage the opposite sides of the nut parts 21, 22 and 23. The ways in the bars 46 being of angular shape to fit the corner angles of the nut parts have the effect of bringing these parts into proper alinement so that, when the ram 38 is released by withdrawal of the detent shelf 42 on continued movement of slide 43, the ram 38 will be forcibly moved downwardly by its spring 39 and will drive home the nut 22 and washer 23 into the shell 21. As the frame 9 approaches the position of registry with the discharge chute 27, the ram 38 is lifted by roller 40 and cam track 41 and cams 4 and 5 restore the slides 15 and 43 to their positions of Fig. 2. A hump on the cam 4, however, causes a momentary excess outward movement of the slide 15 sufficient to push the nut assemblage into the chute 27.

Although but one specific embodiment of this invention is herein shown and described, it will be understood that numerous details of the structure shown may be altered or omitted without departing from the spirit of the invention as defined by the following claims.

I claim:

1. An assembler for lock nuts made up of a nut and a friction disc housed in a close-fitting prismatic shell and each having a central perforation and a prismatic contour, comprising an upright frame, having a base ledge, a laterally retractible member having thereon a pair of bifurcated shelves positioned above said base ledge, said ledge and shelves being adapted to support such friction element, nut and shell in vertical axial alinement, a vertically movable centering pin movable upwardly through the perforations in shell, nut and friction elements for centering same, laterally movable jaws positioned to move into and out of engagement with the nut, friction element and shell and having ways therein for alining corresponding corners of their prismatic contours, means for withdrawing said shelves, and a vertically movable ram alined with said centering pin for forcing said nut and disc into said shell.

2. An assembler for lock nuts made up of a nut and a friction disc housed in a close-fitting prismatic shell and each having a central perforation and a prismatic contour, comprising an upright frame having a base ledge, a laterally retractible member having thereon a pair of bifurcated shelves positioned above said base ledge, said ledge and shelves being adapted to support such friction element, nut and shell in vertical axial alinement, a vertically movable centering pin movable upwardly through the perforations in shell, nut, and friction element for centering same, laterally movable jaws positioned to move into and out of engagement with the nut, friction element and shell and having ways therein for alining corresponding corners of their prismatic contours, means for withdrawing said shelves, and a vertically movable ram alined with said centering pin for forcing said nut and disc into said shell, and mechanism for timing the successive movements of the named parts in the order hereinbefore specified.

3. An assembler for lock nuts having a prismatic shell enclosing a prismatic nut and a prismatic disc, comprising a stationary post, a turntable rotatable on said post, a series of upstanding frames carried by said table and arranged at angular intervals in a circle about said post, a ledge on said table within each said frame, a carrier member movable in a radial path over said ledge and having radially bifurcated shelves positioned to support articles at different levels above said ledge, supply chutes arranged about said table for supplying the shells to said ledges and the nuts and discs to said bifurcated shelves, a delivery chute positioned to receive the assembled lock nuts from said ledges, said chutes being at levels to face said ledges and each said bifurcated shelves respectively and being spaced apart according to the spacing of said frames about said post, each said frame having at its lower part a vertically movable centering pin, having at its upper part a vertically movable ram, and having at opposite sides of said shelves laterally movable jaws adapted to close on the shell, nut and disc on said ledge and shelves and carrying guide ways fitting the vertical corners of the contours of said shell, nut and disc, a radially movable detent for supporting and releasing said ram, an annular wall on said table, closing the spaces between said frames and having openings fronting said ledge and bifurcated shelves, and mechanisms positioned about said post and controlled by the rotation of said table to lift said centering pin, close said jaws, retract said carrier member, lower said centering pin, release said detent and depress said ram, then raise said ram, restore said detent, thrust said carrier outward to discharge the article from said ledge into said delivery chute and to restore said carrier to its initial position, in succession and in the order specified.

4. An assembler for lock nuts made up of a nut, a friction disc and an enclosing shell therefor, each centrally perforated and of prismatic contour, comprising a centering pin for axially alining the nut, disc and shell, coacting movable jaws having angular ways formed therein to fit corresponding corners of such prismatic contours for separately gripping the nut, disc and shell so as to register their respective prismatic contours angularly about the axis, a ram for ramming the nut and disc into the shell, and mechanism operatively connecting said pin, jaws and ram.

5. An assembling device, comprising an upright frame mounted to travel horizontally, having a base ledge, a bifurcated laterally retractible shelf member spaced above said base ledge, feed means to supply to said ledge and shelf member respectively articles of interfittingly similar prismatic contours during the travel of said frame, means providing vertical guide ways shaped for respective lateral engagement with articles on said ledge and shelf member for angularly registering the contours of said articles, a ram above said ledge and shelf member and movable vertically along and between said guideways, and mechanism for shifting said retractible shelf member and depressing said ram to force the articles into assembled relation.

LEOPOLD F. GLAUDE.